No. 622,159. Patented Mar. 28, 1899.
F. MOSSBERG & C. A. BRINK.
BICYCLE ALARM BELL.
(Application filed Dec. 23, 1898.)
(No Model.)
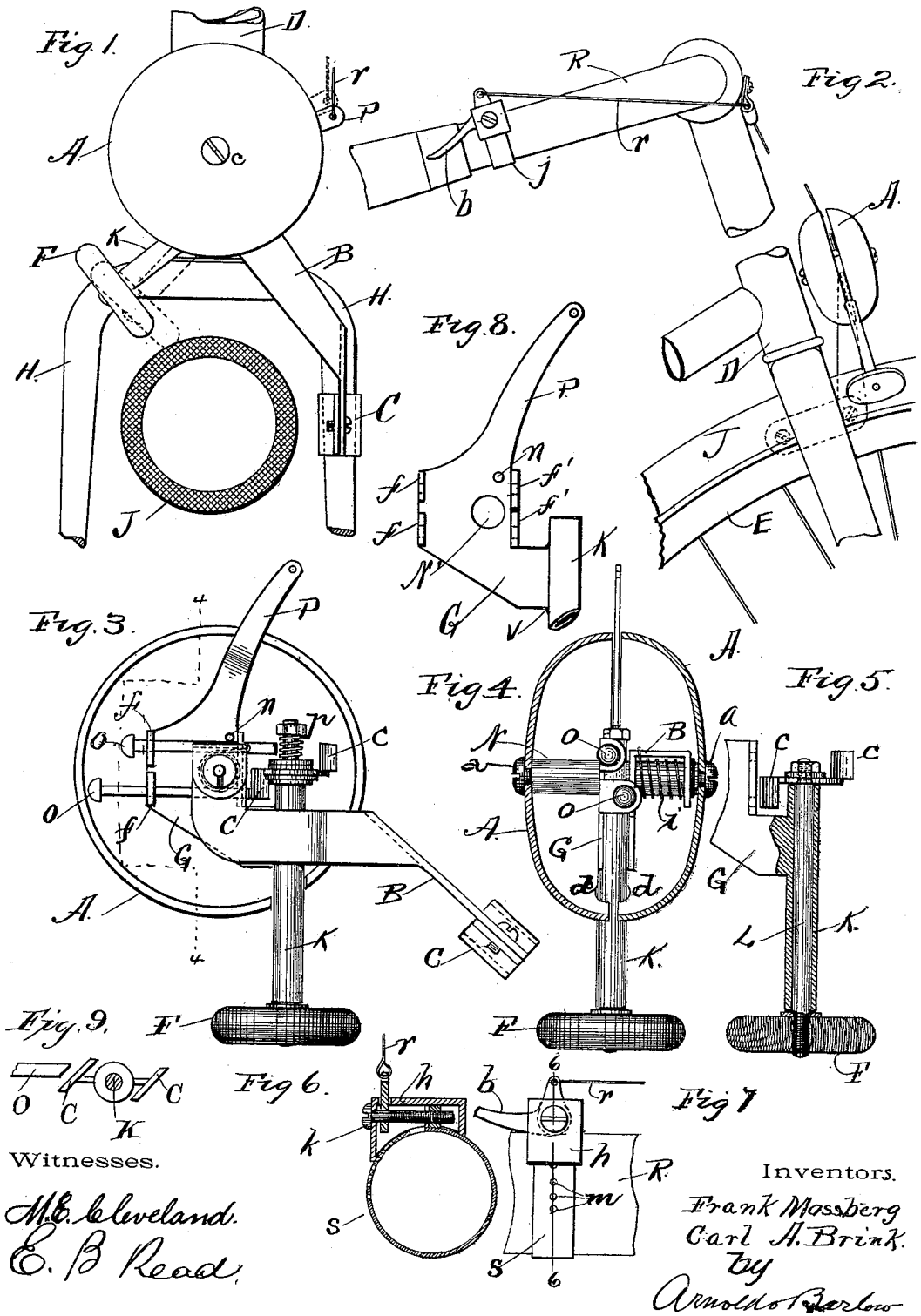
Witnesses.
M. E. Cleveland.
E. B. Read.
Inventors.
Frank Mossberg
Carl A. Brink
by
Arnold & Barlow
Attorneys.

UNITED STATES PATENT OFFICE.

FRANK MOSSBERG AND CARL A. BRINK, OF PROVIDENCE, RHODE ISLAND; SAID BRINK ASSIGNOR TO SAID MOSSBERG.

BICYCLE ALARM-BELL.

SPECIFICATION forming part of Letters Patent No. 622,159, dated March 28, 1899.

Application filed December 23, 1898. Serial No. 700,105. (No model.)

*To all whom it may concern:*

Be it known that we, FRANK MOSSBERG and CARL A. BRINK, of Providence, in the county of Providence and State of Rhode Island, have invented certain new and useful Improvements in Bicycle Alarm-Bells; and we do hereby declare that the following is a full, clear, and exact description thereof, reference being had to the accompanying drawings, and to the letters of reference marked thereon, which form a part of this specification.

This invention relates to the alarm-bells used on bicycles.

It is fully explained and illustrated in this specification and the accompanying drawings.

Figure 1 shows a front elevation of the bell, with a portion of the fork to which the bell is attached. Fig. 2 is a side elevation of a portion of the wheel-frame and fork to which the bell and its mechanism are attached. Fig. 3 is a rear view with one of the bells removed to show the mechanism. Fig. 4 is a side view, with one-half of each bell removed, on line 4 4, Fig. 3, to show the arrangement of the mechanism inside. Fig. 5 shows a section of the bearing of the driving-shaft with the shaft in elevation. Fig. 6 is a cross-section of the starting-lever and its support on line 6 6 in Fig. 7. Fig. 7 is an enlarged side elevation of the starting-lever. Fig. 8 is a plan view of the plate that carries the striking mechanism. Fig. 9 is a detail view showing the striking mechanism.

The object of this invention is to improve the bicycle alarm-bell and simplify the mechanism to make it more reliable and less expensive to manufacture and much easier to run.

The construction is as follows: A center bar N is provided, to which the bells and all the working parts of the mechanism are made fast, the bells by the screws $a\ a$, one for each bell, screwing through the bells into the ends of the bar N, and the other parts are held on the plate G, which is soldered or otherwise fastened to the bar N, so that all the parts turn when the bell is thrown into action, except the bracket B, in which the bar N has a bearing. The shape of plate G is shown in Fig. 8, the upper part forming the arm P, which extends out between the bells and to which the cord $r$ is attached to operate the bell. Two ears $f\ f$ are turned up and bored to receive the hammer-bars $o\ o$, the inner ends of which are held in position by similar ears $f'\ f'$, made on the other edge of the plate. To the lower end of the plate V the tube K, that forms the bearing of the driving-shaft L, is made fast. The shaft L consists of a rod fitted to run easily in the bearing K and has a double dog $c\ c$ held on its inner end, either rigidly or by friction, and it extends down through two notches $d\ d$, made in the edges of the bells, (see Fig. 4,) into a position to have the driving-wheel F, fast on its outer end, come in contact with the tire J of the wheel E. The bracket B is carried up between the bells and then bent around the bearing K and has its upper end bent, as seen in Fig. 4, so as to furnish two bearings for the bar N to turn in, and a spiral torsion-spring $i$ is placed around the bar N, between the two bearings, one end of the spring being held in a hole in that bar and the other end fastened in the bracket for the purpose of bringing the bells, &c., back to position after being rung. Two hammer-rods $o\ o$ are held to slide in the ears $f\ f\ f'\ f'$ (see Fig. 8) and in position to be struck, one by one of the dog-arms $c$ and the other by the opposite dog-arm on their inner ends in the direction of their motion in the ears when the driving-shaft L is turned. (See Fig. 3.) A ring $j$ is attached to one arm of the handle-bar R, and a clip $h$, formed with three sides, has one end reduced down to enter holes $m$ in the ring, and a screw $k$ is put through the same ear and screwed into a projection on the ring to form a pivot for a knee-lever $b$, to the upper end of which the cord $r$ is attached, and the other end of the lever $b$ is shaped to receive the pressure of the fingers of the hand on the bar when the bell is to be sounded. The dogs $c\ c$ are driven by friction by means of a washer and a spring $l$ between the nut $p$ and the dog, which allows the dog to slip on the shaft from the resistance of the hammers $o\ o$ and reduces the relative number of strokes on the bell as the speed of the bicycle is increased, as one great difficulty with the present alarms now in use is to make the ringing of the bell clear and not have the strokes all run into each other and make a confused sound without making the driving-wheel too large. With this friction motion allowing the dog to slip when driven fast, the number of strokes will be greatly equalized in fast or slow riding. The dog may be rigidly attached to the shaft, if desired, by screwing down hard on the nut $p$.

The operation is this: By pulling on the cord connected to the lever $b$ the whole apparatus is turned in the bracket B, so as to bring the driving-wheel F in contact with the tire J, which will cause it to revolve and turn the dog, the arms of which, $c\ c$, as they turn strike in succession the inner ends of the hammers $o\ o$ and throw them out against the bells, first striking one bell with one hammer and then the other bell with the other hammer, and when the strain on the cord is relaxed the spring $i$ will turn the apparatus back to the stop-pin $n$, lifting the wheel F clear of the tire. The turning movement of the apparatus is checked by coming in contact with the stop-pin $n$.

If it is found desirable at any time to use one bell alone, one of the bells may be left off without interfering with the working of the mechanism.

Having thus described our improvements, we claim as our invention and desire to secure by Letters Patent—

1. In a bicycle-alarm the combination of two bells rigidly attached to a bar, held to turn in a stationary bracket, a striking mechanism also rigidly secured to said bar to turn with it, a shaft having a driving-wheel fast on its outer end in position to be turned by the tire of the bicycle-wheel when said bar is turned, substantially as described.

2. In a bicycle-alarm the combination of two bells rigidly attached, one to each end of a bar held to turn in a stationary bracket, a plate also fast on said bar and provided with ears, hammer-rods fitted to slide in holes in said ears, a bearing for a shaft attached to said plate, a shaft fitted to turn in said bearing, a dog secured to one end of the shaft and arranged to operate the sliding hammer-rods, a driving-wheel fast on the outer end of said shaft, with means for turning the bar in the stationary bracket, substantially as described.

3. In a bicycle-alarm the combination with a bell, of a hammer-striking dog, a cam attached to its driving-shaft by frictional driving elements, to allow of a slip of the dog on the shaft as the speed of the driving-wheel is increased, to equalize the number of strokes on the bell, substantially as described.

4. In a bicycle-alarm a bell or bells, mechanism to ring them consisting of a hammer or hammers held to slide freely in bearings with a revolving dog to throw the hammers against said bell or bells, and a driving-shaft with a wheel to be turned by contact with the tire, substantially as described.

In testimony whereof we have hereunto set our hands this 16th day of December, A. D. 1898.

FRANK MOSSBERG.
    CARL A. BRINK.

In presence of—
 BENJ. ARNOLD,
 E. B. READ.